United States Patent
Ma et al.

(10) Patent No.: US 10,831,843 B2
(45) Date of Patent: Nov. 10, 2020

(54) GROUPING AGGREGATION WITH FILTERING AGGREGATION QUERY PROCESSING

(71) Applicant: International Business Machines Corporation, Armonk, NY (US)

(72) Inventors: Wenbin Ma, Vaughan (CA); Liping Zhang, Portland, OR (US); Calisto Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 15/800,195

(22) Filed: Nov. 1, 2017

(65) Prior Publication Data

US 2019/0130040 A1     May 2, 2019

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/2237* (2019.01); *G06F 16/244* (2019.01); *G06F 16/24558* (2019.01); *G06F 16/9038* (2019.01)

(58) Field of Classification Search
CPC .......... G06F 16/9535; G06F 16/24558; G06F 16/2237; G06F 16/9038; G06F 16/244
See application file for complete search history.

(56) References Cited

U.S. PATENT DOCUMENTS 7,930,547 B2 * 4/2011 Hao ............... H04L 45/745
                                                      713/176
8,005,868 B2 * 8/2011 Saborit ........... G06F 16/24556
                                                      707/796

(Continued)

FOREIGN PATENT DOCUMENTS

WO     2016/161809 A1    10/2016
WO     2016/174171 A1    11/2016

OTHER PUBLICATIONS

Ming-Chuan Wu, "Query Optimization for Selection using Bitmaps", ACM, pp. 227-238 (Year: 1999).*

(Continued)

*Primary Examiner* — Jared M Bibbee
(74) *Attorney, Agent, or Firm* — William H. Hartwell; Hunter E. Webb; Keohane & D'Alessandro, PLLC

(57) ABSTRACT

Embodiments described herein provide a solution for optimizing a generating of query search results. A filtering search term (e.g., a search term that is used in a query to perform filtering aggregations of the query search results) is identified. A filtering bitmap that has a plurality of mapped locations corresponding to data values for the filtering search term is created. As a data value in the filtering search term is encountered during a scan of the query search results, the corresponding mapped location is updated. Each mapped location in the filtering bitmap is read to determine whether the value corresponding to the mapped location satisfies the filtering aggregation. The filtering aggregation can then be performed (e.g., prior to any grouping aggregation) by removing any of the query search results determined, based on the filtering bitmap, as having data values for which the filtering aggregation is not satisfied.

20 Claims, 6 Drawing Sheets

(51) Int. Cl.
*G06F 16/9038* (2019.01)
*G06F 16/242* (2019.01)
*G06F 16/22* (2019.01)
*G06F 16/2455* (2019.01)

(56) References Cited

U.S. PATENT DOCUMENTS

| | | | | |
|---|---|---|---|---|
| 8,626,770 | B2* | 1/2014 | He | G06F 16/2237 |
| | | | | 707/741 |
| 8,972,337 | B1* | 3/2015 | Gupta | G06F 16/221 |
| | | | | 707/602 |
| 9,195,599 | B2 | 11/2015 | Barber et al. | |
| 9,280,780 | B2* | 3/2016 | Turner | G06Q 30/0201 |
| 2008/0313132 | A1* | 12/2008 | Hao | H04L 45/00 |
| 2010/0228701 | A1* | 9/2010 | Harris, III | H04L 51/12 |
| | | | | 707/683 |
| 2012/0173540 | A1* | 7/2012 | Kirk | G06F 16/2255 |
| | | | | 707/745 |
| 2013/0226972 | A1* | 8/2013 | Kosuru | G06F 16/283 |
| | | | | 707/802 |
| 2014/0379985 | A1* | 12/2014 | Barber | G06F 12/0811 |
| | | | | 711/122 |
| 2015/0066861 | A1* | 3/2015 | Ritto | G06F 16/21 |
| | | | | 707/661 |
| 2016/0335318 | A1* | 11/2016 | Gerweck | G06F 16/2282 |
| 2016/0378827 | A1* | 12/2016 | Bondalapati | G06F 16/24542 |
| | | | | 707/718 |
| 2018/0121504 | A1* | 5/2018 | Bienert | G06F 16/2453 |
| 2018/0144048 | A1* | 5/2018 | Kim | G06F 16/334 |
| 2018/0276289 | A1* | 9/2018 | Gross | G06F 16/24556 |

OTHER PUBLICATIONS

Guang-Ho Cha, "Bitmap Indexing Method for Complex Similarity Queries with Relevance Feedback", Nov. 27, 2003, ACM, pp. 55-62 (Year: 2003).*

Shenoda Guirguis et al., "Optimized Processing of Multiple Aggregate Continuous Queries", CIKM'11, Oct. 24-28, 2011, Glasgow, Scotland, UK, Copyright 2011 ACM, pp. 1515-1524.

Bin He et al., "Efficient Iceberg Query Evaluation Using Compressed Bitmap Index", IEEE Transactions on Knowledge and Data Engineering, vol. 24, No. 9, Sep. 2012, pp. 1570-1583.

Christian Lemke et al., "Speeding Up Queries in Column Stores A Case for Compression", Copyright Springer-Verlag Berlin Heidelberg 2010, pp. 117-129.

TPS-DS, "TPC-DS is a Decision Support Benchmark", Copyright 2001-2017 TPC, 1 page.

SAP Hana, "Database for Next-Generation Business Applications and Real-Time Analytics", Copyright 2012 SAP.AG, 18 pages.

Rong Chen et al., "Tiled-MapReduce: Optimizing Resource Usages of Data-parallel Applications on Multicore with Tiling", PACT' 2010, Sep. 11-15, 2010, Vienna, Austria, Copyright 2010 ACM, 12 pages.

* cited by examiner

GROUPING AGGREGATION WITH FILTERING AGGREGATION QUERY PROCESSING

TECHNICAL FIELD

This invention relates generally to generating a set of search results and, more specifically, to more efficiently processing a query having both grouping aggregation and filtering aggregation.

BACKGROUND

In the networked computing environment of today, data storage and retrieval is a key function. Since their creation, computers have been used to store information and to retrieve that information for later use. However, as the amount of data in storage has grown and queries used to retrieve the data have become more complex, more and more resources (e.g., processing, storage, and/or the like) have become necessary to process the queries.

Complex aggregation queries are common in analytical query workloads. These queries often contain grouping aggregation (e.g., a GROUP BY clause) as well as filtering aggregation (e.g., a HAVING clause), and can also be part of a nested query. Further, these workloads typically run on very large data sets (e.g., in a multi-core SMP database system, Spark or Hadoop systems on premise and/or in the cloud) and require large amounts of resources (memory, processing capacity and/or inter/intra-node communication bandwidth) to ensure satisfactory processing time for users.

SUMMARY

In general, embodiments described herein provide a solution for optimizing a generating of query search results. A filtering search term (e.g., a search term that is used in a query to perform filtering aggregations of the query search results) is identified. A filtering bitmap that has a plurality of mapped locations corresponding to data values for the filtering search term is created. As a data value in the filtering search term is encountered during a scan of the query search results, the corresponding mapped location is updated. Each mapped location in the filtering bitmap is read to determine whether the value corresponding to the mapped location satisfies the filtering aggregation. The filtering aggregation can then be performed (e.g., prior to any grouping aggregation) by removing any of the query search results determined, based on the filtering bitmap, as having data values for which the filtering aggregation is not satisfied.

One aspect of the present invention includes a method for optimizing a generating of query search results, comprising: creating a filtering bitmap based on the filtering search term used in a query to perform a filtering aggregation of the query search results, the filtering bitmap having a plurality of mapped locations corresponding to data values for the filtering search term; updating, during a scanning of the query search results, the plurality of mapped locations based on a presence of a data value in the filtering search term that corresponds to a mapped location of the plurality of mapped locations; reading the filtering bitmap to determine, for each mapped location of the plurality of mapped locations, whether the data value corresponding to the mapped location satisfies the filtering aggregation; and filtering the query search results to remove a subset of query search results having data values for which the filtering aggregation is not satisfied.

Another aspect of the present invention includes a computer system for optimizing a generating of query search results, the computer system comprising: a memory medium comprising instructions; a bus coupled to the memory medium; and a processor coupled to the bus that when executing the instructions causes the system to: create a filtering bitmap based on the filtering search term used in a query to perform a filtering aggregation of the query search results, the filtering bitmap having a plurality of mapped locations corresponding to data values for the filtering search term; update, during a scanning of the query search results, the plurality of mapped locations based on a presence of a data value in the filtering search term that corresponds to a mapped location of the plurality of mapped locations; read the filtering bitmap to determine, for each mapped location of the plurality of mapped locations, whether the data value corresponding to the mapped location satisfies the filtering aggregation; and filter the query search results to remove a subset of query search results having data values for which the filtering aggregation is not satisfied.

Yet another aspect of the present invention includes a computer program product for optimizing a generating of query search results, the computer program product comprising a computer readable storage device, and program instructions stored on the computer readable storage device, to: create a filtering bitmap based on the filtering search term used in a query to perform a filtering aggregation of the query search results, the filtering bitmap having a plurality of mapped locations corresponding to data values for the filtering search term; update, during a scanning of the query search results, the plurality of mapped locations based on a presence of a data value in the filtering search term that corresponds to a mapped location of the plurality of mapped locations; read the filtering bitmap to determine, for each mapped location of the plurality of mapped locations, whether the data value corresponding to the mapped location satisfies the filtering aggregation; and filter the query search results to remove a subset of query search results having data values for which the filtering aggregation is not satisfied.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
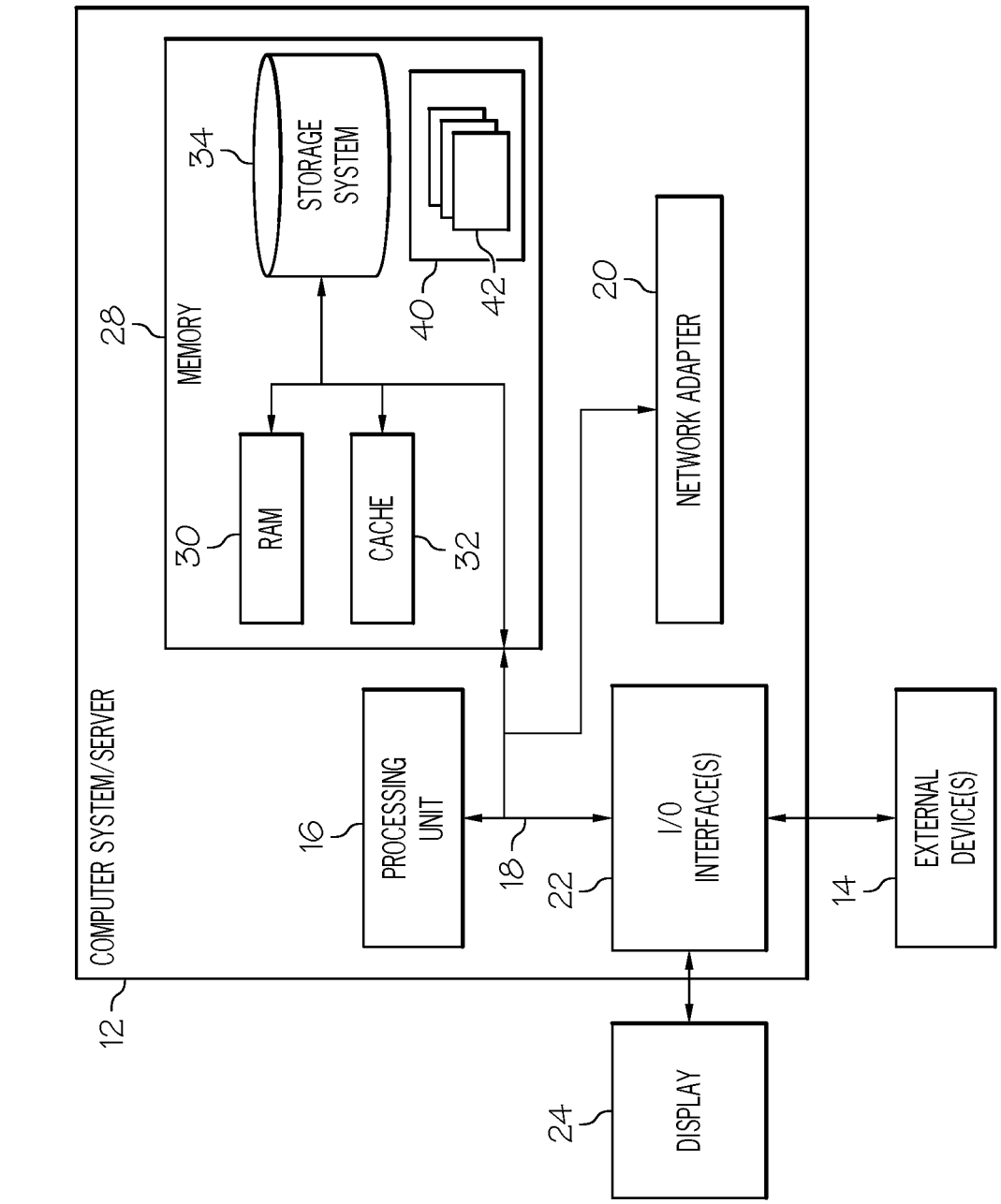
FIG. 1 shows an architecture in which the invention can be implemented according to an embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising" and the like, or "includes" and/or "including" and the like, when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the actions and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide a solution for optimizing a generating of query search results. A filtering search term (e.g., a search term that is used in a query to perform filtering aggregations of the query search results) is identified. A filtering bitmap that has a plurality of mapped locations corresponding to data values for the filtering search term is created. As a data value in the filtering search term is encountered during a scan of the query search results, the corresponding mapped location is updated. Each mapped location in the filtering bitmap is read to determine whether the value corresponding to the mapped location satisfies the filtering aggregation. The filtering aggregation can then be performed (e.g., prior to any grouping aggregation) by removing any of the query search results determined, based on the filtering bitmap, as having data values for which the filtering aggregation is not satisfied.

Referring now to FIG. 1, a computerized implementation 10 for optimizing a generating of query search results will be shown and described according to an embodiment. Computerized implementation 10 is only one example of a suitable implementation and is not intended to suggest any limitation as to the scope of use or functionality of embodiments of the invention described herein. Regardless, computerized implementation 10 is capable of implementing and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can include addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for optimizing a generating of query search results. It should be understood that any other computers implemented under the present invention may have different components/software, but can perform similar functions. Computer system 12, as noted above in a non-limiting example, may be a server.

Computer system 12 in computerized implementation 10 is shown in the form of a general-purpose computing device. The components of computer system 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for optimizing a generating of query search results, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and/or program data. Each of the operating system, one or more application programs, other program modules, program data and/or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
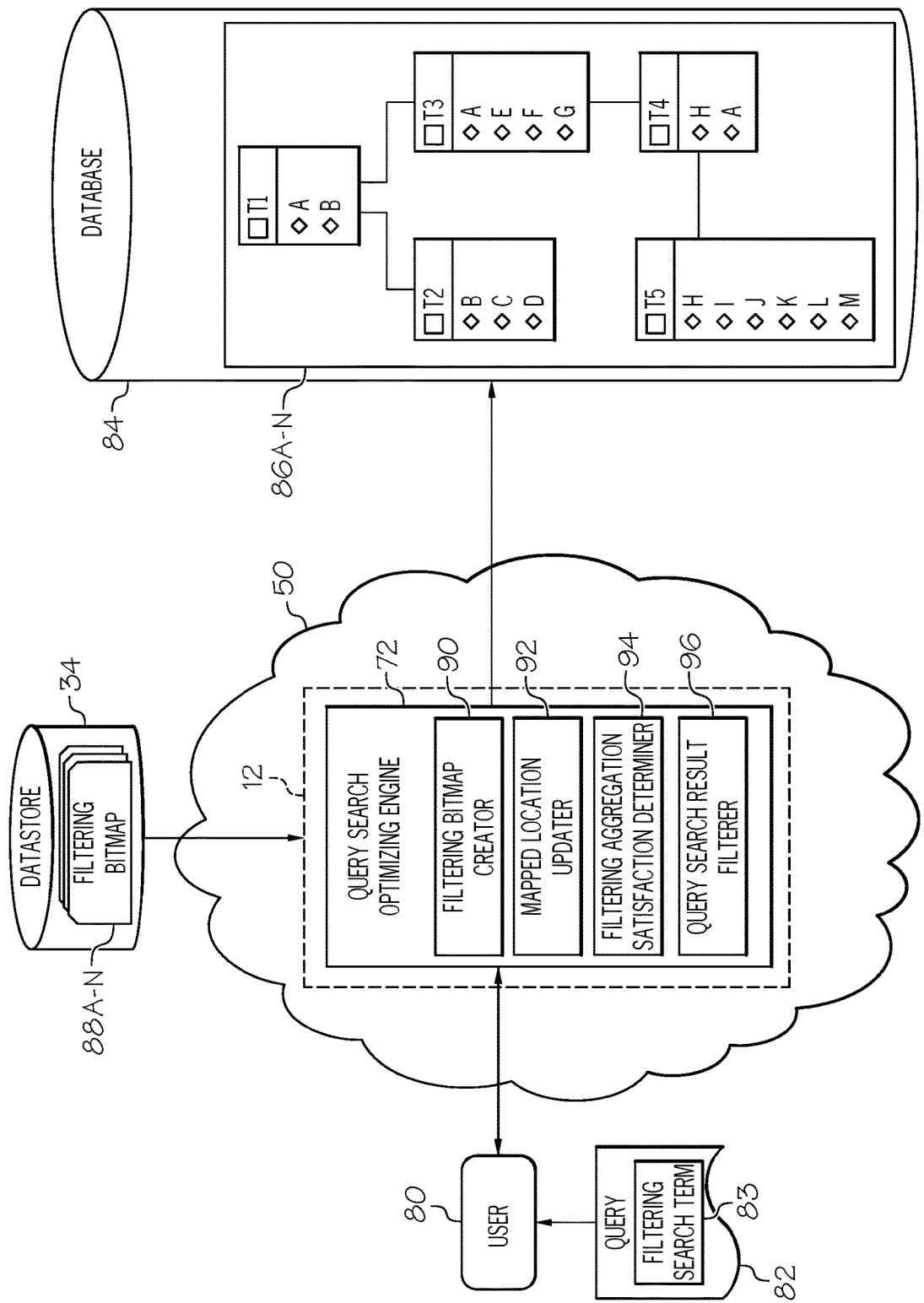
FIG. 2 shows a system diagram according to an embodiment of the present invention.

Referring now to FIG. 2, a system diagram describing the functionality discussed herein according to an embodiment of the present invention is shown. It is understood that the teachings recited herein may be practiced within any type of computing environment, including, but not limited to, a networked computing environment 50 (e.g., a cloud computing environment). A stand-alone computer system/server 12 is shown in FIG. 2 for illustrative purposes only. In the event the teachings recited herein are practiced in a networked computing environment 50, each client need not have a query search optimizing engine (hereinafter "system 72"). Rather, all or part of system 72 could be loaded on a server or server-capable device that communicates (e.g., wirelessly) with the clients to provide an optimized generating of query search results therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to the generating of search results in response to a query 82 (e.g., proposed by a user 80) in networked computing environment 50. Such other system(s) have not been shown in FIG. 2 for brevity purposes.

Along these lines, system 72 may perform multiple functions similar to a general-purpose computer. Specifically, among other functions, system 72 can optimize a generating of query search results (e.g., in response to query 82 on a set of data records 86A-N in a database 84) in networked computing environment 50. To accomplish this, system 72 can include: a filtering bitmap creator 90, a mapped location updater 92, a filtering aggregation satisfaction determiner 94, and a query search result filterer 96. In any event, the technical effect of system 72 is to provide processing instructions to computer system/server 12 in order to more efficiently return query search results from a database 84 query 82.

As further illustrated, FIG. 2, shows database 84 within which a number of data records 86A-N may be stored. Database 84 may store these data records 86A-N hierarchically, relationally, and/or using any other solution that is now known or later developed. In any case, a user 80 who wishes to retrieve one or more data records 86A-N from database 84 will generally create a query 82 that specifies the exact data records 86A-N that the user 80 wishes to retrieve. Such a query 82 can be in any query language now known or later developed for performing query searches on a database 84, including, but not limited to: structured query language (SQL), query by example (QBE), and/or the like. In any case, query 82 generally specifies which field or fields contain the desired data records 86A-N and the tables, if any, or other locations in which the fields are located. Query 82 may also contain aggregation instructions that specify how the data records 86A-N are to be sorted, which data records 86A-N are to be returned and which data records 86A-N are to be filtered out from the end result, and/or the like.

The inventors of the invention described herein have discovered certain deficiencies in the current solutions for optimizing the compiling of program code. For example, assume the following query:

```
SELECT a.ca_state state, count(*) cnt
FROM customer_address a
    ,customer c
    ,store_sales s
    ,date_dim d
    ,item i
WHERE
    a.ca_address_sk = c.c_current_addr_sk
    and c.c_customer_sk = s.ss_customer_sk
    and s.ss_sold_date_sk = d.d_date_sk
    and s.ss_item_sk = i.i_item_sk
    and d.d_month_seq =
        ( select distinct (d_month_seq)
        from date_dim
        where d_year = 2000
            and d_moy = 2)
    and i.i_current_price > 1.2 *
        ( select avg(j.i_current_price)
        from item j
        where j.i_category = i.i_category)
GROUP BY a.ca_state
HAVING count(*) >= 10
ORDER BY cnt
fetch first 100 rows only;
```

Without optimization, the query would have to join all the tables (customer address, customer, store_sales, date_dim and item) and apply the predicate under WHERE clause to generate the large data set. This data set would then undergo grouping aggregation based on the GROUP BY clause namely GROUP BY a.ca_state to compute the aggregation count(*) and then perform filtering aggregation based on the HAVING clause namely HAVING COUNT(*)>=10 before being sorted. If it is assumed that 100 million groups are generated after grouping the multiple billion rows from the join operation and only 1 million of them eventually can pass the HAVING count(*)>=10 condition, then processing time is being wasted in performing the grouping aggregation on the entire 100 million groups.

Current solutions for optimizing query searches utilize coordination between the parallel elements of modern parallel systems to combine the local aggregates for a group into a final global aggregate. For example, in one solution all elements access a single aggregation data structure, which can be a hash table or a sort. This can save on memory requirements because there is only one copy of the data, but the synchronization cost is often high for this approach. In other solutions, the data is distributed based on some factor to different parallel systems element for grouping and/or aggregation. However, these solutions can be heavily processor and/or memory intensive and require processing of the entire dataset. Further, the cost to merge and/or communicate the results from the individual parallel elements to obtain the final search results can be high. Yet another solution attempts to rewrite complex aggregation queries to modify the order of operations and to apply predicates that filter data earlier. However, pushing down a filtering aggregation below the grouping aggregation may not be able to be specified in the query, especially when the filtering aggregation is done on the aggregation function result for each group. Further, writing an already complicated query automatically is often difficult if not impossible as the query is being compiled for processing.

The current invention provides a way to filter out query search results that have data values for which the filtering aggregation is not satisfied at an early stage (e.g., before the grouping aggregation is performed). It does this by utilizing the aggregation predicate in the filtering aggregation (e.g., "HAVING" clause in SQL) to pre-filter data. The teaching described herein can be naturally incorporated as part of the data partitioning operations or scanning in runtime before the aggregation (e.g., grouping aggregation) phase. As a result, the present invention can discard unwanted data early and significantly reduce the amount of data on which the aggregation is later performed, reducing unnecessary aggregation computation cost and memory consumption and saving time and resources. Further, the filtering bitmap data structure used to perform this filtering saves significantly on memory costs over current optimizing solutions and does not require specialized hardware, such as parallel processing elements, although these can still be used to perform other functions. Thus, the operation of the computer during the large-scale retrieval of data is improved.

Referring again to FIG. 2, filtering bitmap creator 90 of system 72, as executed by computer system/server 12, is configured to create a filtering bitmap (generically 88N) that is based on a filtering search term 83. This filtering search term 83 is a search term in the query that is used in query 82 to perform a filtering aggregation of the query search results. To this extent, filtering search term 83 can be identified by parsing query 82 (e.g., before or as query 82 is being compiled) to identify search terms that are used to perform a filtering aggregation on the results of query 82. For example, in an SQL query, if a HAVING clause performs the filtering aggregation, the data field upon which the HAVING clause is based can be identified as the filtering search term 83. Thus, in the example query 82 included above, the HAVING clause is based on a count predicate is the "state" data field, and, as such, the "state" data field would be identified as filtering search term 83 and the filtering bitmap 88N would be generated based on that data field.

It should also be understood that in cases where multiple filtering aggregations (e.g., multiple HAVING clauses) are present in the same query 82, filtering bitmap creator 90 could create different filtering bitmaps 88A-N for each different identified filtering search term 83. Alternatively, a single filtering bitmap 88N that represents all of the identified filtering search terms 83 could be created. Further, in cases in which the data is partitioned prior to aggregation, separate filtering bitmaps 88A-N can be created for each partition, in order to facilitate the grouping and aggregation processing before scanning the data. In this case, the total size of each filtering bitmap 88N can be based on an estimated grouping key cardinality in each partition.

In any case, filtering bitmap 88N is a bitmap data structure (e.g., a Bloom filter) that has a plurality of mapped locations included therein. These mapped locations correspond to data values or hashed values based on the data values in filtering search term 83. For example, if filtering search term 83 is based on the field "states", the mapped locations in filtering bitmap 88N would correspond to the data values contained in the field (e.g., AL, CA, MA, TX, etc.) In any case, these data value of filtering search term 83 for each query search result can be hashed to get the corresponding mapped location in filtering bitmap 88N. Alternatively, mapped locations could be accessed using any solution for assessing a location in a data structure that is now known or later developed including, but not limited to: indexing, linked list traversal, tree traversal, graph traversal, and/or the like.

In any case, each mapped location in filtering bitmap 88N could be a single data bit or multiple data bits, depending on the predicate used in the filtering aggregation (e.g., HAVING COUNT(C)/MIN(C)/MAX(C)/SUM(C) condition). To this extent, the determining of how many bits to include in each mapped location can be determined based on multiple factors, including, but not limited to: whether an encoded form or a value form is used to represent the predicate; whether the bits are used to track the relation operation result or simply to track the column value in the aggregation clause (e.g., HAVING clause); whether negative values, positions, etc., need to be tracked; and/or the like.

For example, if the predicate is a minimum or maximum function, each mapped location in the filtering bitmap could be created as a single-bit field that acts as a flag. Alternatively, if the predicate is a "count" function, each mapped location in the filtering bitmap could be created as a multi-bit field having as many bits as are necessary to represent the necessary value (e.g., 2 bits for values from 0-3, 3 bits for values 0-7, etc.). Further, if the filtering aggregation of a query 82 has multiple predicates (e.g., both a count and a max) for the same filtering search term 83, the filtering bitmap 88N for that filtering search term 83 could have fields corresponding to each predicate (e.g., a multi-bit field for the count and a single bit field for the max) in the same mapped location on the filtering bitmap 88N. Additionally or in the alternative, in cases in which a single filtering bitmap 88N has been created to represent multiple identified filtering search terms 83, filtering bitmap 88N could have mapped locations and/or fields within mapped locations corresponding to each predicate/filtering search term 83 combination.

In another example, assume a query 82 that has the following term: HAVING MAX(C)>5, and further assume that each integer is 4-byte and a 32-bit mapped location can be used to represent each value. In such a case, each mapped location could be either a 32-bit multi-bit unit to hold the value of max(C) for the corresponding groups or could use a single 1-bit value to indicate the true/false of MAX(C)>5 for groups mapped to that location. The likely decision in this case would be to use the 1-bit solution instead of the 32-bit solution for the memory consideration and efficiency. In yet another example, for query 82 with HAVING COUNT (*)=1 or >1 or >=1 or >=2, a 2-bit per mapped location bitmap can be utilized.

In any case, in an embodiment, once a filtering bitmap 88N has been created, the potential effectiveness of the filtering bitmap 88N can be evaluated. For example, in a hashed embodiment the bit distribution and/or other accessing characteristics of the created filtering bitmap 88N can be analyzed to determine whether the group, as determined by the hash function, has an efficient distribution. For example, if the analysis finds a relatively large number of unique values in filtering bitmap 88N, but filtering bitmap 88N shows heavy skew and/or only a limited number of slots are used, it can be deduced that either the hash function needs to be improved or the size of filtering bitmap 88N is too small. In such a case, filtering bitmap 88N can be regenerated with a new hash function or the size of filtering bitmap 88N can be adjusted (e.g., made larger) depending on the findings. Based on this, the partition can be re-scanned and the filtering bitmap 88N can be rebuilt.

Figure 3:
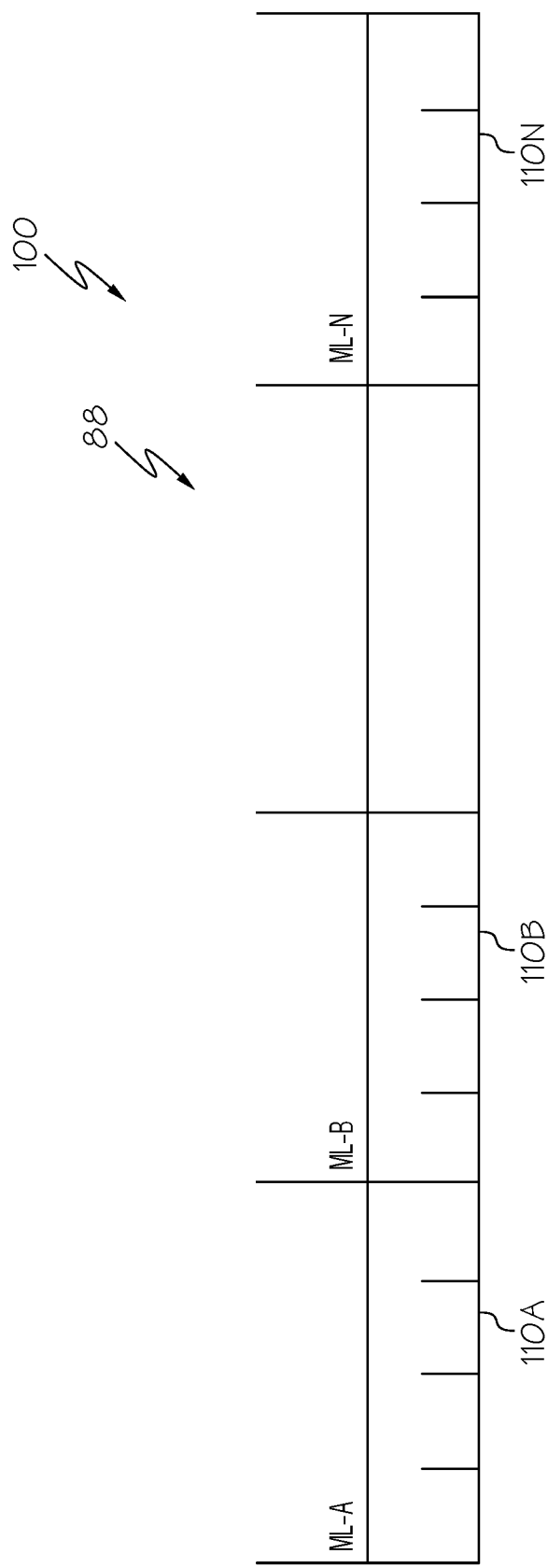
FIG. 3 shows an example creation of a filtering bitmap according to an embodiment of the present invention.

Referring now to FIG. 3, an example creation 100 of filtering bitmap 88 is shown according to an embodiment of the present invention. As shown, filtering bitmap 88 has a plurality of mapped locations ML-A through ML-N. As shown, filtering bitmap 88 of FIG. 3 is based on query 82 having filtering aggregation based on the HAVING count (*)>=10 statement in the above-referenced example. To this extent, each of mapped locations ML-A through ML-N is a multi-bit field having four bits allowing each location to hold a counter that has a maximum value of 15 and, as such, is able to represent the required value of 10. Further, in this example, as the filtering bitmap 88 has just been created, each of the current values 110A-N in each of the mapped locations ML-A through ML-N is empty.

Referring again to FIG. 2, mapped location updater 92 of system 72, as executed by computer system/server 12, is configured to update the mapped locations in filtering bitmap 88N. Specifically, as the search query search results are being scanned, mapped location updater 92 can determine the data value that is present in filtering search term 83. Mapped location updater 92 can use (e.g., hash) this data value to access the mapped location in filtering bitmap 88N that corresponds to the data value and then change the value in this mapped location. For example, if the mapped location corresponding to the data value was created as a single-bit field, the updating could include changing the value in the mapped location to set a flag bit in the single-bit field. Alternatively, if the map location corresponding to the data value was created as a multi-bit field, the updating could include changing the value in the mapped location to increment the value in the multi-bit field by one.

Figure 4:
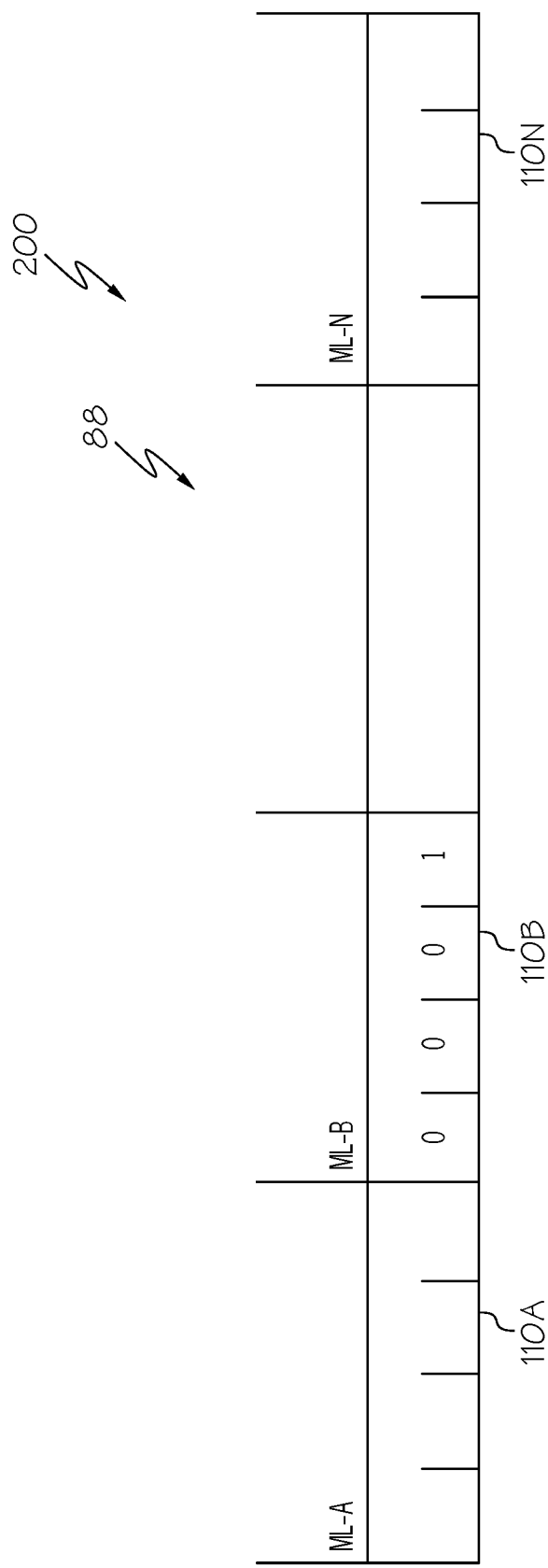
FIG. 4 shows an example updating of a filtering bitmap according to an embodiment of the present invention.

Referring now to FIG. 4, an example updating 200 of a filtered bitmap is shown according to an embodiment of the present invention. Assume again the example in which query 82 has the term HAVING count(*)>=10, which is based on the filtering search term 83<state>. Assume additionally that during the course of the scanning, a query search result having the data value TX in the <state> field is encountered. Further assume that the mapped location labeled ML-B corresponds to the value TX. Mapped location ML-B corresponding to the data value TX is accessed (e.g., via a hash of the data value TX). Then, as illustrated, value 110B in mapped location ML-B is incremented to 0001 (e.g., the number 1).

Referring again to FIG. 2, filtering aggregation satisfaction detector 94 of system 72, as executed by computer system/server 12, is configured to read filtering bitmap 88 to determine which data values of filtering search term 83 satisfy the filtering aggregation. This can be done by comparing the values in each of the mapped locations in filtering bitmap 88N against the filtering condition(s) of the filtering aggregation. For example, in cases in which the mapped locations are single-bit fields, satisfaction detector 94 can check the mapped locations to determine whether the flags corresponding to particular data values have been set or have been remained unset, as appropriate. Alternatively, in cases in which the mapped locations are multi-bit fields, the values in the mapped locations corresponding to each data value can be compared against a specified value in the filtering aggregation to determine whether the data value is greater than, less than, or equal to the specified value, as appropriate. In an embodiment, data values (e.g., those that do not satisfy the filtering aggregation) can be flagged for further processing.

Figure 5:
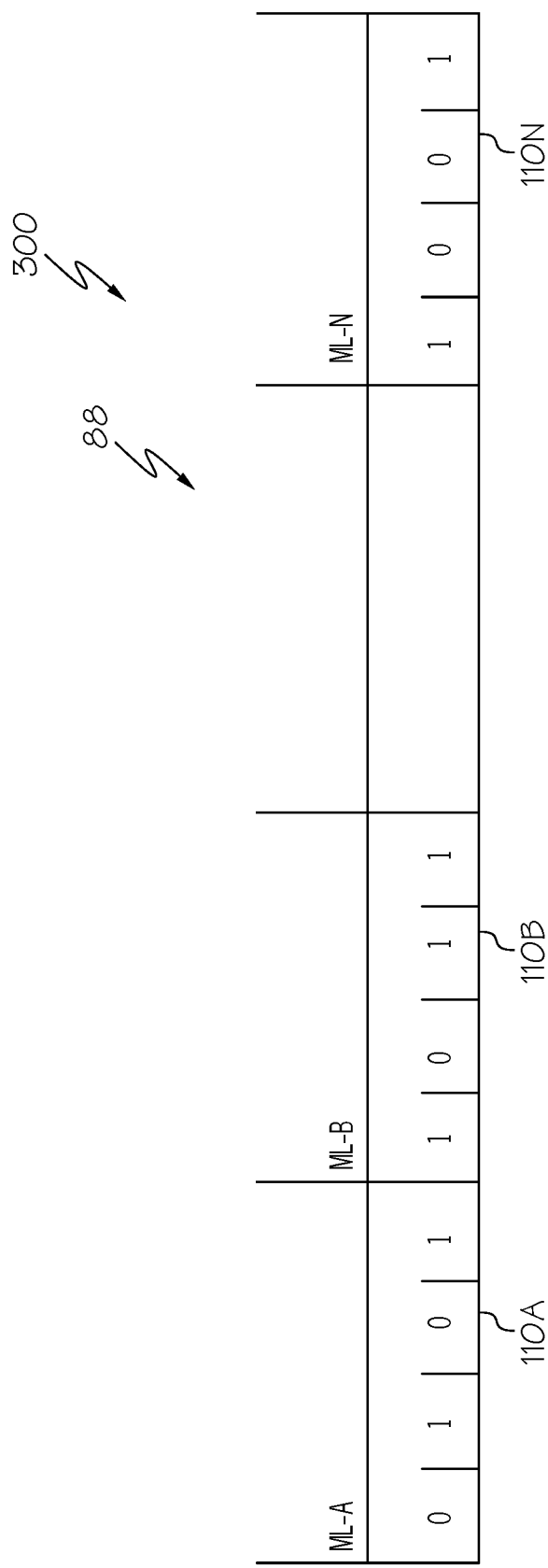
FIG. 5 shows an example determination according to an embodiment of the present invention.

Referring now to FIG. 5, an example determination 300 using filtering bitmap 88 is shown according to an embodiment of the invention. As shown, the updating of values 110A-N in filtering bitmap 88 has been completed. As shown, the values 110A-N corresponding to mapped locations ML-A, ML-B, and ML N are 5, 11, and 9, respectively. Assume again the example in which query 82 has the term HAVING count(*)>=10, which is based on the filtering search term 83<state>. Each of the values 110A-N would be evaluated against the specified value of 10 to determine whether the specific value 110A-N satisfies the filtering aggregation condition of being greater or equal to 10. As illustrated, mapped location ML-B, which has a value 110B of 11, would be determined to have satisfied the condition. Conversely, mapped location 110A, which has a value 110A of 5, and mapped location 110N, which has a value 110N of 9, would be determined as having not satisfied the filtering aggregation condition.

Referring again to FIG. 2 in conjunction with FIG. 5, query search result filterer 96 of system 72, as executed by computer system/server 12, is configured to filter the query search results to remove a subset of the query search results. This subset of query search results removed by query search result filterer 96 can include any or all query search results for which the filtering aggregation is not satisfied. To accomplish this, query search result filterer 96 will scan the query search data, including the query search data in each partition, if applicable. In embodiments in which filtering aggregation satisfaction detector 94 flags the data values that fail to satisfy the filtering aggregation, query search result filterer 96 can simply remove query search results having these flagged data values during the scan. Alternatively, in an embodiment, query search result filterer 96 can work in conjunction with filtering aggregation satisfaction detector 94 to identify and eliminate unsatisfactory query search results (e.g., in a single scan pass). In this embodiment, as each query search result is being scanned, the filtering aggregation satisfaction detector 94 uses filtering search term 83 data values for each query search result to access filtering bitmap 88 and determine whether the data value satisfies the filtering aggregation. Any query search result for which the value 110A-N in the corresponding mapped location does not meet the required condition (e.g., the filtering aggregation is not satisfied) is removed by query search result filterer 96. Conversely, any query search result for which the value 110A-N in the corresponding mapped location meets the required condition (e.g., satisfies the filtering aggregation) is retained.

In any case, in the example of FIG. 5, all five query search results having data values corresponding to mapped location ML-A could be removed by query search result filterer 96. Similarly, all nine query search results having data values corresponding to mapped location ML-N could also be removed. Conversely, the 11 query search results having data values corresponding to mapped location ML-B would be retained in the query search result dataset (e.g., for further grouping aggregation, presentation to user 80, etc.).

Figure 6:
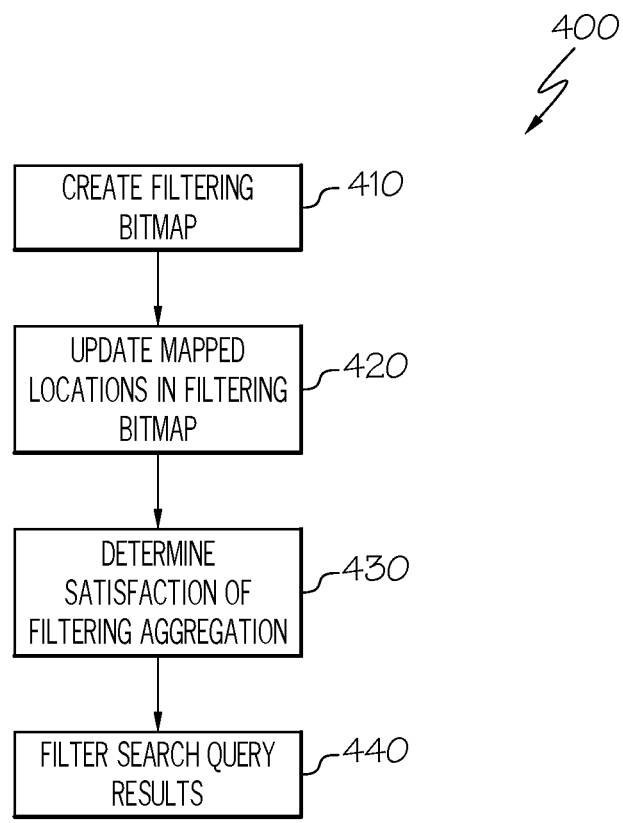
FIG. 6 shows an example process flowchart according to an embodiment of the present invention.

Referring now to FIG. 6 in conjunction with FIG. 2, a method flowchart 400 according to an embodiment of the present invention is shown. At 410, filtering bitmap creator 90 of system 72, as executed by computer system/server 12, creates a filtering bitmap 88N that is based on a filtering search term 83 used in a query to perform a filtering aggregation of the query search results. This filtering bitmap 88N has a plurality of mapped locations that correspond to data values for the filtering search term 83. At 420, mapped location updater 92 of system 72, as executed by computer system/server 12, updates the plurality of mapped locations during a scanning of the query search results based on the presence of a data value in the filtering search term 83 that corresponds to one of the mapped locations. At 430, filtering aggregation satisfaction detector 94 of system 72, as executed by computer system/server 12, determines whether the filtering aggregation has been satisfied for each of the mapped locations. At 440, query search result filterer 96 of system 72, as executed by computer system/server 12, filters the query search results to remove any query search results that have data values that do not satisfy the filtering aggregation.

Process flowchart 400 of FIG. 6 illustrates the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit including custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, include one or more physical or logical blocks of computer instructions, which may, for instance, be organized as an object, procedure, or function. Nevertheless, the executables of an identified system or unit need not be physically located together, but may include disparate instructions stored in different locations which, when joined logically together, include the system or unit and achieve the stated purpose for the system or unit.

Further, a system or unit of executable code could be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for optimizing a generating of query search results. Thus, embodiments herein disclose a process for supporting computer infrastructure, including integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for optimizing a generating of query search results. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands including words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, such as a hardware storage device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches for optimizing a generating of query search results. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing a generating of query search results, comprising:
   creating, in response to receipt of a query, a filtering bitmap specific to the query and based on a filtering search term used in the query to perform a filtering aggregation of the query search results, the filtering bitmap having a plurality of mapped locations corresponding to data values for the filtering search term upon which the filtering aggregation is based;
   updating, during a scanning of the query search results, the plurality of mapped locations in the filtering bitmap based on a presence of a data value in the filtering search term that corresponds to a mapped location of the plurality of mapped locations;
   reading the filtering bitmap to determine, for each mapped location of the plurality of mapped locations, whether the data value corresponding to the mapped location satisfies the filtering aggregation; and
   filtering the query search results to remove a subset of query search results having data values for which the filtering aggregation is not satisfied.

2. The method of claim 1, further comprising:
   creating a second filtering bitmap based on a second filtering search term used to perform the filtering aggregation in the query,
   wherein the updating additionally updates mapped locations in the second filtering bitmap, and
   wherein the reading further determines whether a data value of the second filtering search term satisfies the filtering aggregation based on the second filtering bitmap.

3. The method of claim 1, wherein the filtering aggregation includes a HAVING clause, the HAVING clause including a predicate selected from a group consisting of: a count, a minimum, a maximum, and a sum, and wherein the filtering search term is a term of the HAVING clause.

4. The method of claim 1, the updating further comprising:
   hashing the data value to get the corresponding map location; and
   changing a value in the corresponding map location,
   wherein the filtering bitmap is a bloom filter.

5. The method of claim 4,
   wherein the corresponding map location is created as a single-bit field; and
   wherein the changing of the value further comprises setting a flag bit in the single-bit field.

6. The method of claim 4,
   wherein the corresponding map location is created as a multi-bit field; and
   wherein the changing of the value further comprises incrementing the value in the multi-bit field.

7. The method of claim 1, further comprising performing, subsequent to the filtering, a grouping aggregation.

8. A computer system for optimizing a generating of query search results, the computer system comprising:
   a memory medium comprising instructions;
   a bus coupled to the memory medium; and
   a processor coupled to the bus that when executing the instructions causes the system to:
   create, in response to receipt of a query, a filtering bitmap specific to the query and based on a filtering search term used in the query to perform a filtering aggregation of the query search results, the filtering bitmap having a plurality of mapped locations corresponding to data values for the filtering search term upon which the filtering aggregation is based;

update, during a scanning of the query search results, the plurality of mapped locations in the filtering bitmap based on a presence of a data value in the filtering search term that corresponds to a mapped location of the plurality of mapped locations;

read the filtering bitmap to determine, for each mapped location of the plurality of mapped locations, whether the data value corresponding to the mapped location satisfies the filtering aggregation; and filter the query search results to remove a subset of query search results having data values for which the filtering aggregation is not satisfied.

9. The computer system of claim 8, the instructions further causing the system to:

create a second filtering bitmap based on a second filtering search term used to perform the filtering aggregation in the query, wherein the instructions to update additionally updates mapped locations in the second filtering bitmap, and wherein the instructions to read further determines whether a data value of the second filtering search term satisfies the filtering aggregation based on the second filtering bitmap.

10. The computer system of claim 8, wherein the filtering aggregation includes a HAVING clause, the HAVING clause including a predicate selected from a group consisting of: a count, a minimum, a maximum, and a sum, and wherein the filtering search term is a term of the HAVING clause.

11. The computer system of claim 8, the instructions to update further causing the system to:

hash the data value to get the corresponding map location; and change a value in the corresponding map location, wherein the filtering bitmap is a bloom filter.

12. The computer system of claim 11, wherein the corresponding map location is created as a single-bit field; and wherein the changing of the value further comprises setting a flag bit in the single-bit field.

13. The computer system of claim 11, wherein the corresponding map location is created as a multi-bit field; and wherein the changing of the value further comprises incrementing the value in the multi-bit field.

14. The computer system of claim 8, the instructions causing the system to perform, subsequent to performing the instructions causing the system to filter, a grouping aggregation.

15. A computer program product for optimizing a generating of query search results, the computer program product comprising a computer readable storage device, and program instructions stored on the computer readable storage device, to:

create, in response to receipt of a query, a filtering bitmap specific to the query and based on a filtering search term used in the query to perform a filtering aggregation of the query search results, the filtering bitmap having a plurality of mapped locations corresponding to data values for the filtering search term upon which the filtering aggregation is based;

update, during a scanning of the query search results, the plurality of mapped locations in the filtering bitmap based on a presence of a data value in the filtering search term that corresponds to a mapped location of the plurality of mapped locations;

read the filtering bitmap to determine, for each mapped location of the plurality of mapped locations, whether the data value corresponding to the mapped location satisfies the filtering aggregation; and filter the query search results to remove a subset of query search results having data values for which the filtering aggregation is not satisfied.

16. The computer program product of claim 15, the computer readable storage device further comprising instructions to:

create a second filtering bitmap based on a second filtering search term used to perform the filtering aggregation in the query, wherein the instructions to update additionally updates mapped locations in the second filtering bitmap, and wherein the instructions to read further determines whether a data value of the second filtering search term satisfies the filtering aggregation based on the second filtering bitmap.

17. The computer program product of claim 15, the instructions stored on the computer readable storage device to update further comprising instructions to:

hash the data value to get the corresponding map location; and change a value in the corresponding map location, wherein the filtering bitmap is a bloom filter.

18. The computer program product of claim 17, wherein the corresponding map location is created as a single-bit field based on the filtering aggregation having a predicate that is selected from a group consisting of: a minimum, a maximum, and a sum; and wherein the changing of the value further comprises setting a flag bit in the single-bit field.

19. The computer program product of claim 17, wherein the corresponding map location is created as a multi-bit field based on the filtering aggregation having a predicate that is a count; and wherein the changing of the value further comprises incrementing the value in the multi-bit field.

20. The computer program product of claim 15, the instructions stored on the computer readable storage device to remove further comprising instructions to perform, subsequent to performing the instructions causing the system to filter, a grouping aggregation.

* * * * *